March 4, 1924. Re. 15,787

A. L. LARSON

SINTERING MACHINE GRATE

Original Filed Aug. 20, 1920 3 Sheets-Sheet 1

Inventor
A. L. Larson
By Harry A. Baines Atty.

March 4, 1924. Re. 15,787

A. L. LARSON

SINTERING MACHINE GRATE

Original Filed Aug. 20, 1920 3 Sheets-Sheet 2

Inventor:
A. L. LARSON.

By Harry A. Baines Attys.

March 4, 1924. Re. 15,787

A. L. LARSON

SINTERING MACHINE GRATE

Original Filed Aug. 20, 1920 3 Sheets-Sheet 3

Inventor:
A. L. LARSON.

By Harry A. Barnes Atty.

Reissued Mar. 4, 1924. Re. 15,787

UNITED STATES PATENT OFFICE.

AUGUST L. LARSON, OF KELLOGG, IDAHO, ASSIGNOR TO COEUR D'ALENE HARDWARE AND FOUNDRY COMPANY, OF WALLACE, IDAHO, A CORPORATION OF IDAHO.

SINTERING-MACHINE GRATE.

Original No. 1,373,620, dated April 5, 1921, Serial No. 404,778, filed August 20, 1920. Application for reissue filed March 31, 1923. Serial No. 629,180.

*To all whom it may concern:*

Be it known that I, AUGUST L. LARSON, a citizen of the Dominion of Canada, residing at Kellogg, county of Shoshone, State of Idaho, have invented certain new and useful Improvements in Sintering-Machine Grates, of which the following is a specification.

This invention has relation to improvements relating to what is known as Dwight & Lloyd sintering machines and more particularly has reference to improvements to that form of grate mechanism embodied in the present practical application of sintering machines of the type mentioned, known as the Stewart grate construction, and my invention is specifically directed to the improved arrangement of the grate bottoms of the pallets or carriers embodied in such grate construction.

It is well known to those familiar with the use of sintering machines, that the modern type of such machines include a large number, as high as forty-two individual pallets or carriers that travel along endless ways with the ore contained therein which are subjected, during a part of their travel, to the desulfurizing and sintering operation, after which, in the return movement and inverted position, the loads of treated ore contained in the said individual pallet are discharged, the empty pallets traveling back to be again conveyed to their uppermost position to be again recharged.

In the construction of sintering machines of the general type stated, each pallet has a grated bottom whose members are bolted tightly to the pallet sides and as a result of such attachment, when the grates become heated and expansion takes place, the grate bars or members do not stay in the desired alinement and also, due to the heat of the furnace, clinkers frequently are formed in the slots of the grate surface, thereby greatly interfering with the extraction of the sulfuric gases. To overcome this serious objectionable condition, it has been necessary to station a man at each machine whose duty it was to clean the grates as the pallets move around the furnace.

That this defect in the desired or perfect operation of the Dwight & Lloyd sintering machine be fully appreciated, it should be stated, by the improper expansion of the grate irons (and by the improper expansion is meant that the heat of the furnace causes the grate members to expand in different directions) which results in the grate slots becoming tight on the one side and leaving too much space at the other side, and since the ore in the traveling pallet is usually crushed fine, it (the ore) naturally passes through such widened grate slots, often necessitating the shoveling of tons of the wasted ore back into the bins to be again carried through the roasting process.

Primarily, my invention has for its object to provide a grate construction for pallets of sintering machines, which is self-cleaning and which practically overcomes the improper expansion of the grate irons and the consequent elimination of the aforesaid ore wastage and extra labor required for gathering such wastage for retreatment.

Another and essential feature of my invention is the provision of a grate construction for sintering machine pallets or ore carriers, in which the grate members are particularly designed for being economically made, easily applied for use, and employed to a greater advantage in a number of respects than can be present in the construction of grate bottoms of the character referred to and used in ore treating apparatus.

The preferred embodiment of my invention is illustrated in the accompanying drawings in which sufficient portions of a sintering machine are represented as is necessary to illustrate a practical application of my invention and in which.

Figure 11:
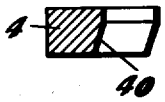
Figure 12:
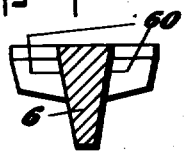
Figure 13:
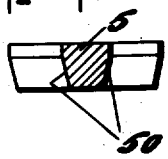
Figure 9:
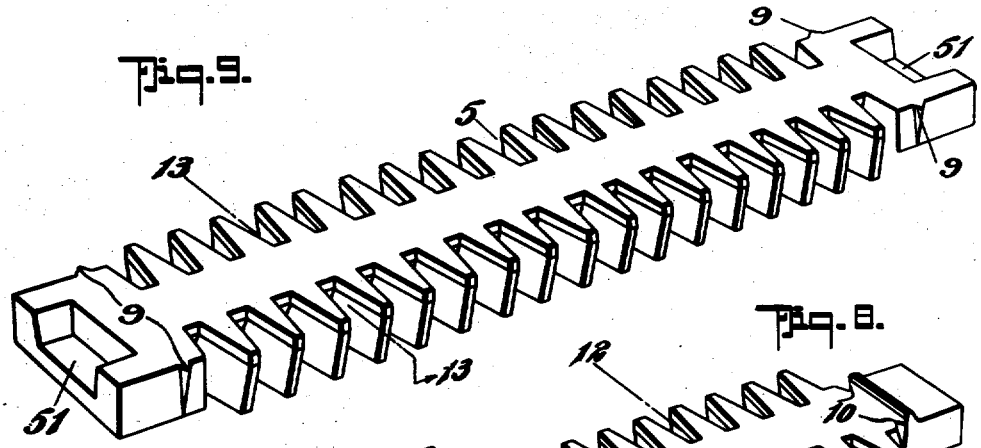
Fig. 9 is a perspective view of one of the stationary grate bars.
Figure 8:
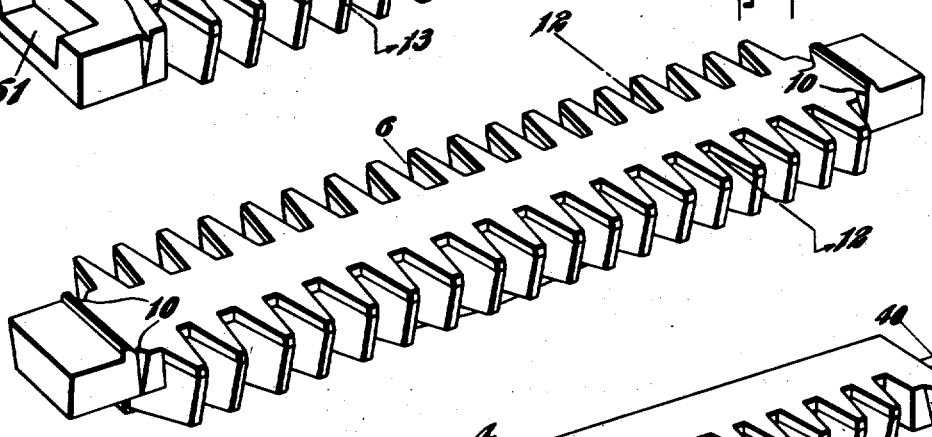
Fig. 8 is a similar view of one of the movable grate bars.
Figure 7:
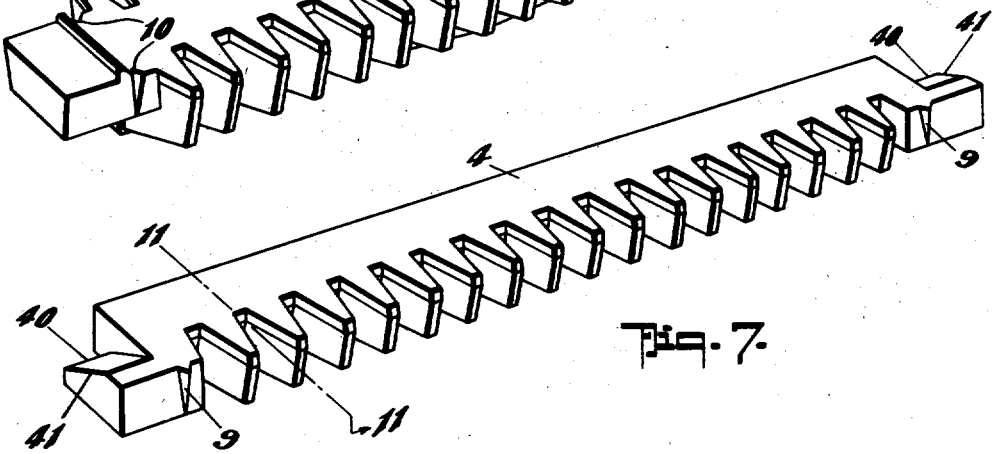
Fig. 7 is a perspective view of one of the end grate bars.

Figs. 11, 12, and 13 are detail cross sections taken on the lines 11—11, 12—12, and 13—13 on Figs. 7, 8, and 9 respectively.

Figure 1:
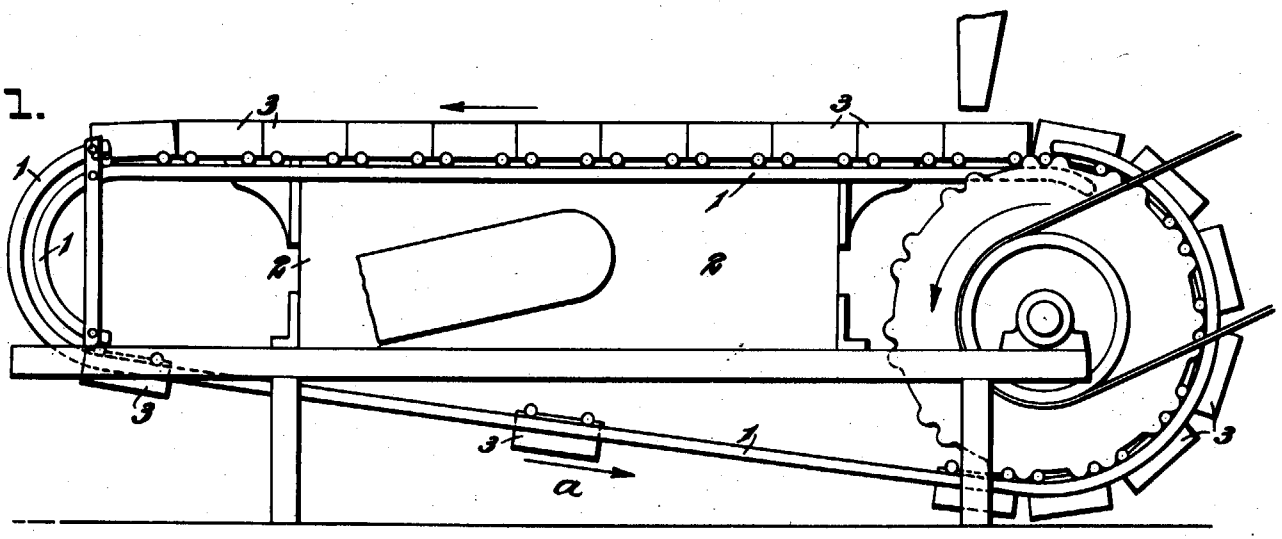
Figure 1 is a side elevation of a portion of a sintering or ore roasting machine, several of the pallets or carriers being shown in operative position.
Figure 3:
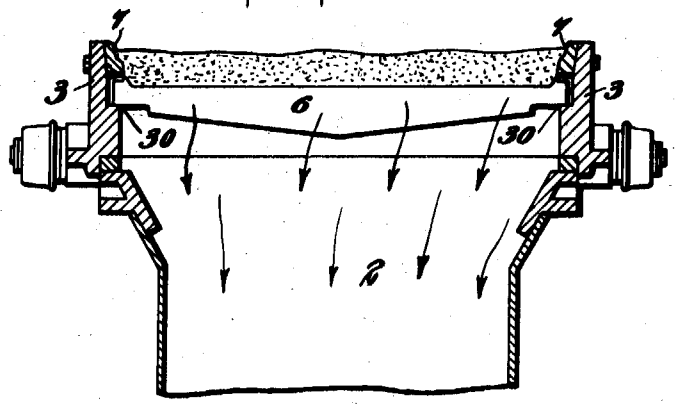
Fig. 3 is a detail cross section taken on the line 3—3 of Fig. 2.
Figure 2:
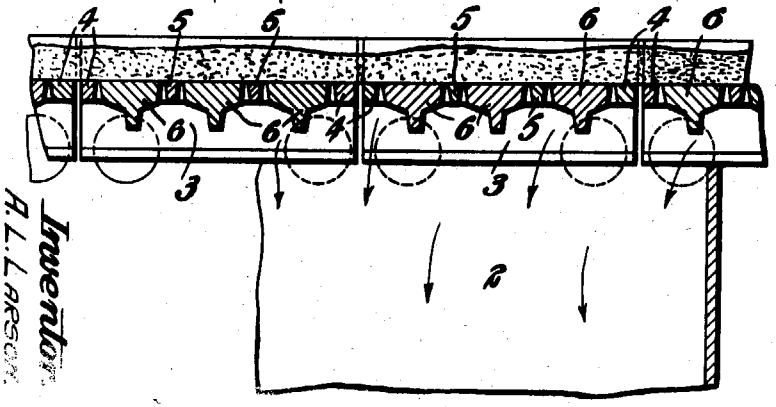
Fig. 2 is a diagrammatic sectional view, which illustrates a number of ore loaded pallets positioned as passing across the ore box of the sintering machine.

As before stated, my improved grate construction is especially designed for constituting the bottom of pallets or carriers that form an essential feature of the Dwight & Lloyd types of sintering machines and that the operative arrangement of such pallets and their grate construction be readily understood, a sintering machine of the kind stated is diagrammatically illustrated in Fig. 1 of the drawings and the cooperative arrangement of the members of the pallets or carriers with the ways on which they travel and the air or suction box over which they pass is illustrated in Figs. 2 and 3 and, in the said Figs. 1, 2, and 3, 1 designates the endless track that is arranged to support and direct the series of pallets or carriers 3, which serve as the supporters for the ore during the roasting and sintering operation.

It should be stated, the pallets, in practice, are caused to move slowly in the direction indicated by the arrows *a*, the means for effecting such direction of movement of the pallets for feeding the ore to the said pallets and for igniting the ore, after being delivered to the pallets, being readily understood by those familiar with the use of sintering machines of the type mentioned by referring to Fig. 1, it being also understood that, after the ore has been ignited, it passes with the pallets across the air box 2 and after passing from the air box, the said pallets, in their travel, pass downward over a circular path, overturning at such point to discharge whatever load they may carry, one of the pallets being shown positioned at the discharge point in Fig. 1 and another indicated as returning down the inclined way toward the other end for being again carried up in position for reloading in the same figure.

The general arrangement of a number of pallets or carriers, their grates and the manner of sustaining such pallets on their guides and ways is clearly indicated in Figs. 2 and 3, which also show the normal relation of the grate members and the means for confining them in proper operative position within the pallet frame.

In the present construction of sintering machines of the type referred to, the grate bars are all fixedly held in place, either by bolting the grate irons individually to the sides of the pallets or by connecting bars made in an angled shape and which project slightly over the grate, such arrangement causing a percentage of the ore to pass through without having the gases properly extracted, the said connecting bars usually requiring six bolts for securing them in place, thereby causing some inconvenience, when it is necessary to remove or replace a grate iron.

Figure 4:
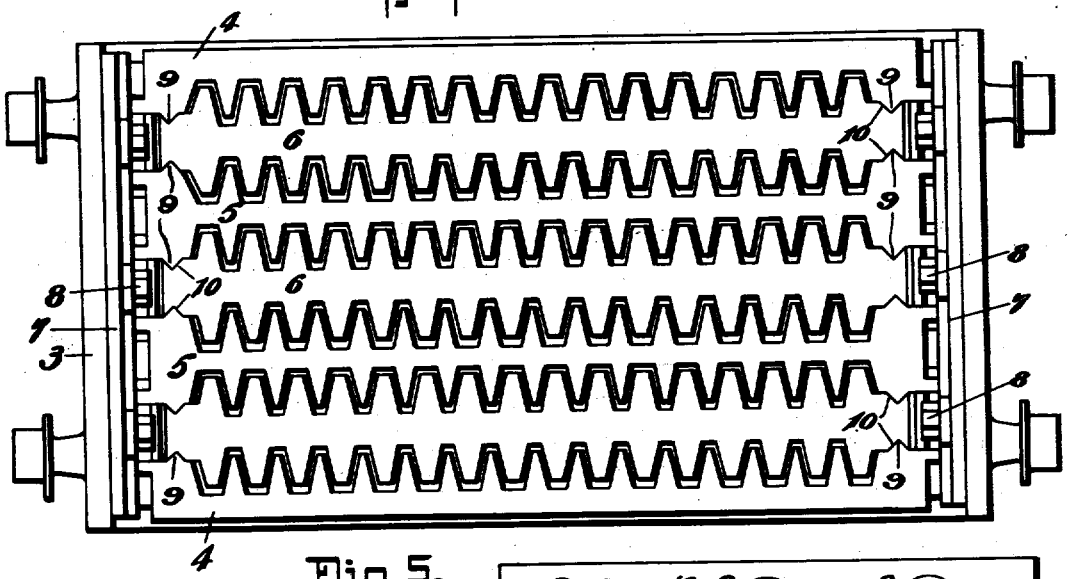
Fig. 4 is a plan view of a pallet equipped with my improved construction of grate bottom.
Figure 5:
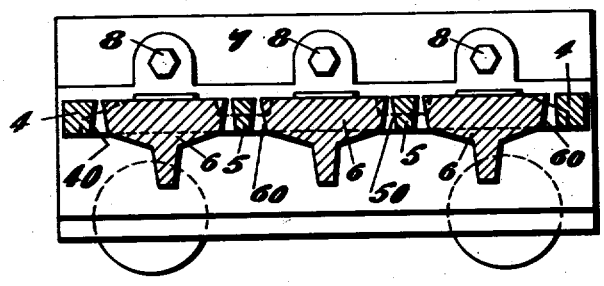
Fig. 5 is a cross section thereof, the grate bars or irons being at the normal or load carrying position.
Figure 6:
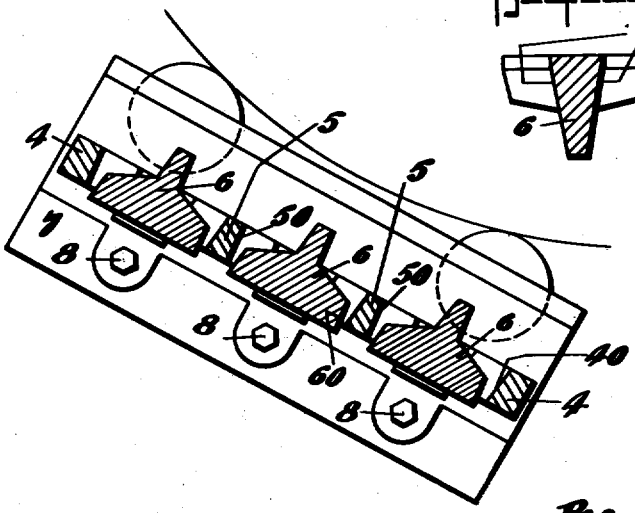
Fig. 6 is a view similar to Fig. 5, the pallet being shown at a reversed or dumping position and the movable grate irons at their shifted position for effecting the self-cleaning of the iron.

Referring now more specifically to the essential features of my invention, reference is made to Figs. 4, 5, and 6 of the drawings, which illustrate a complete pallet in which is included my improved construction of grate bars.

The grate bottom, as shown, comprises two fixedly held end grate bars 4—4, two intermediate fixed grate members 5—5, three movable grate bars 6—6—6 and two connecting bars 7—7, one of which is located at each end of the pallet or box.

One of the movable grate members 6 mentioned is located between the pair of fixed grate members or bars 5—5 and the other two movable members 6—6 are located between a fixed bar and an end bar at their respective sides of the pallet frame, as is best shown in Figs. 2, 4, 5, and 6.

The end bars 4, as also the intermediate or fixed grate members 6, are of like construction, one of each of the said end bars, the movable bars and the intermediate fixed bars being shown in detail in Figs. 7, 8, and 9, respectively.

It will be noticed by referring to Fig. 5, the adjacent edges 40, 50, and 60 of the several ends, the movable and the fixed grate bars are tapered to allow for a certain amount of play of the movable bars sufficient when the pallet reaches the turning over or discharging position, shown in Fig. 6, for dumping the ore, that the jars cause the movable bars to shake in such manner and to leave their normal position, shown in Figs. 2 and 5, and assume the position shown in Fig. 6 that the slots or spaces between the several grate bars are self-cleaned and, as the movable bars 5, in practice, fall the distance of about one-half an inch, provides for forcing any ore on the grates, in the form of clinkers, out of the grate slots, the ore falling into the proper bin.

In my construction of grate, the several bars 4, 5, and 6 have their ends peculiarly shaped for cooperating with the coacting edges of the connecting bars that hold the several bars 4, 5, and 6 down onto the inturned angled flanges 30 of the pallet frame and, in my grate construction, there are two of such connecting bars 7, one for each end of the pallet box or frame and for engaging with their respective ends of the grate bar.

Figure 10:
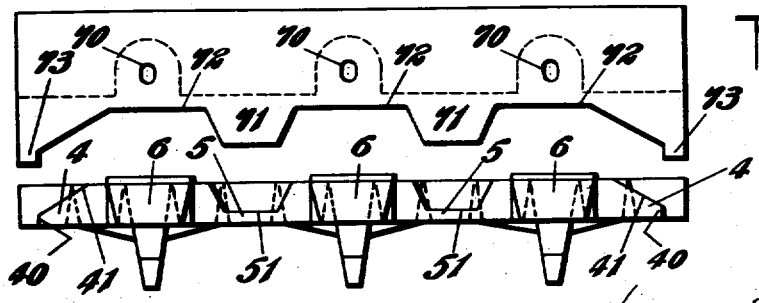
Fig. 10 is a detail view illustrating the cooperative relation of the clamping bar shown in face view and the assembled grate units, the latter being shown in end elevation.

Each connecting bar 7, one of which is shown in detail in Fig. 10, is of sufficient length to extend across the full width of the pallet box (see Fig. 4) and it has three bolt holes 70—70—70 for receiving the fastening bolts 8 and each bolt hole is elongated vertically for adjusting the bar 7 to allow for a proper fitting of the connecting bar in connection with the several fixed grate bars.

The lower edge of each connecting bar 7 is shaped for effecting a simple and easily fitted adjustment with the peculiarly shaped ends of the several grate bars 4, 5, and 6 and for such purpose, the said lower edge has a pair of pendant tapered lugs 71—71 adapted for seating within tapered sockets 51—51 in the adjacent ends of the grate bar 5, to thereby fixedly hold the said bar 6 down upon the pallet flanges 30—30.

At the opposite sides of the tapering lugs 71—71, the lower edge of the bar 7 has tapered sockets 72, three of such sockets being provided and made of sufficient width to allow the bearing faces of the movable grate bars 6 to move therebetween, when the pallet assumes the turned over position, as indicated in Fig. 6, the slots being tapered in such a manner to allow plenty of play for the movable grates.

To provide a close fitting of the connecting bar 7 and also for holding the end grate bars as an integral part of the complete grate structure, so that, under expansion and contraction, all of the grate members move together, the opposite ends of the connecting bar are of greater depth than the other parts thereof, by reason of the lug-like extensions 73—73 that fit down into off-sets 40—40 in the ends of the bars 4—4, which ends are also beveled, on their top surface, as at 41, for the close fitting of the tapering edges of the end sockets into which the outermost ones of the movable bars enter, as they drop from between their adjacent end and fixed grate members.

One of the essential features in my grate construction, is the means for holding the specified grate bars from expanding irregularly and for such purpose, each of the fixed and the end grate bars, which latter are also relatively fixed bars, at the opposite sides of their ends, have vertical ribs 9 that taper from the widest or head portion, at the top face of the grate, to a V-shaped ending at the bottom of the bar and the said ribs 9 on the said bars 4 and 5 are adapted for extending into like shaped vertical grooves 10—10 on the adjacent edges of the movable bars 6, the tapered form of the ribs 9 and the grooves 10 permitting of free movement of the bars 5 with respect to the other bar and reduces frictional binding of such parts.

By providing positive contacting points between all of the grate bars that constitute the complete set of grate bars and arranged in the manner described and shown, when the grate irons begin to expand, under the heat of the furnace, causes the entire pallet (all of the parts thereof being relatively in contact) to expand the same way and thereby reduces to the minimum danger of the grate irons expanding in different directions, the closing of the slots at one side and excessive widening of other slots at the other side.

The means for holding the several grate bars in proper operative position on the pallet flanges 30 (the connecting bar 7) is such that the removal of the said bars is rendered simple and may be quickly effected and also renders it very convenient for removing and replacing a grate bar, when necessary.

While this description is directed to a grate for the Dwight & Lloyd type of sintering apparatus, my improved grate is equally useful in an intermittent type of apparatus wherein the sintering pan is rotated about its own axis. Furthermore, my invention need not be restricted to the specific grate herein described, since any relative movement of the grate bars resulting in a distortion of the grate surface is broadly contemplated. It follows from the foregoing that the distorting of the grate surface, or the bringing of different portions of said surface into different planes so as to destroy the evenness of that surface with the dumping of the pan, or treatment vessel, constitutes the principal feature of my invention.

Having described my invention, I claim:

1. In a grate for ore carriers or pallets, a series of relatively fixedly held grate irons and other grate irons cooperative with the fixedly held irons and movably mounted with respect to the said fixedly held irons and having a limited outward drop relatively to the fixedly held arms, as the pallet or carrier is inverted.

2. In combination with a pallet frame having an inwardly extended bearing flange along each of its ends; of a grate construction that comprises a number of relatively fixedly held bars and a movable bar located between each pair of adjacent fixedly held bars and means along the ends of the pallets for limiting the outward movement of the said movable grate bars as the pallet assumes a turned over position.

3. In an ore carrying pallet for sintering machines, the combination with a bearing flange along each of the opposite ends of the pallet frame; of a series of alternately disposed relatively fixedly held grate bars having their opposite ends shaped to rest upon the aforesaid flanges, other grate bars intermediate the relatively fixedly held bars having their ends shaped to rest upon the said end flanges of the pallet frame and having movement outwardly with respect to the said relatively fixedly held grate bars, and means attachable to each of the pallet ends adapted for engagement with the ends of the several relatively fixedly held bars and provided with stop portions for limiting the outward thrust of the movable bars, as the pallets assume a turned over position.

4. In a sintering machine pallet, a grate that constitutes the bottom of the pallet, the said grate being composed of pairs of relatively fixedly held grate bars and other bars, one of said other bars intermediate each pair of the relatively fixedly held bars, the said other bars having movement vertically between the said fixedly held bars, as the pallet assumes the turned over position, and means on each of the opposite ends of the pallet for limiting the outward drop of the said movable bar and for holding the other bars to their relatively fixed position.

5. In a sintering machine pallet, a grate bottom including a series of relatively fixedly held bars and a series of other bars intermediate the relatively fixedly held bars, the said intermediate bars having vertical movement between the other bars, as the pallet turns over, the said movable and fixedly held bars having relatively slidable contacting portions at the opposite edges at each of their opposite ends for the purpose stated.

6. In a grate construction for sintering machine pallets, the combination with the pallet frame having an inturned bearing flange along the opposite sides and ends, a pair of end grate bars that engage the side and end portions of the pallet flange, a plurality of intermediate grate bars whose opposite ends terminate in narrow extensions for resting upon the opposite flanges at the opposite ends of the pallet, other grate bars between each pair of the intermediate grate bars and between the intermediate grate bars and the adjacent end bars, the said intermediate bars having reduced end extensions for resting on the end flanges of the pallet frame, and connecting bars removably attachable one to each pallet end, the said bars having their lower edge shaped for positively engaging the end extensions of the end and the intermediate bars, whereby to fixedly hold the said bars onto the pallet flange bearings and provided with socket portions that fit over the end extensions of the aforesaid other bars between the fixedly held bar, whereby to provide for a limited outward movement of the said other bars between their adjacent bars for dislodging clinkers and the like, as the pallets assume their turned over position.

7. A grate construction for sintering machine pallets, comprising two end bars, two fixed bars, a movable bar between each end and an adjacent fixed bar, another movable bar between the fixed bars and means for securing the several bars in their fixed and movable relation within the pallet frame, the said means comprising an internal bearing flange along each of the opposite ends of the pallet frame, and a connecting bar removably attachable to each end of the pallet frame with the lower edge positively engaged with the end and the fixed bars and having socket portions that fit over the adjacent ends of each of the movable bars.

8. A grate construction for sintering machine pallets, comprising two end bars, two fixed bars, a movable bar between each end and an adjacent fixed bar, another movable bar between the fixed bars and means for securing the several bars in their fixed and movable relation within the pallet frame, the said means comprising an internal bearing flange along each of the opposite ends of the pallet frame, and a connecting bar removably attachable to each end of the pallet frame with the lower edge positively engaged with the end and the fixed bars and having socket portions that fit over the adjacent ends of each of the movable bars, and means tending to constantly hold all of the grate bars in edgewise contact with each other and with the pallet frame to thereby cause the entire pallet to expand together.

9. A grate construction for sintering machine pallets, comprising two end bars, two fixed bars, a movable bar between each end and an adjacent fixed bar, another movable bar between the fixed bars and means for securing the several bars in their fixed and movable relation within the pallet frame, the said means comprising an internal bearing flange along each of the opposite ends of the pallet frame, and a connecting bar removably attachable to each end of the pallet frame with the lower edge positively engaged with the end and the fixed bars and having socket portions that fit over the adjacent ends of each of the movable bars, and means tending to constantly hold all of the grate bars in edgewise contact with each other and with the pallet frame and thereby cause the entire pallet to expand together, the said means including tapered ribs and coengaging grooves along the meeting edges of each pair of grate bars, whereby constant contact between the several movable and fixedly held bars is maintained, as the movable bars work outward during the turning over of the pallet, as it passes to the ore dumping position.

10. In a grate construction for sintering machine pallets, the combination with the pallet frame and a set of relatively fixed grate bars, of a second set of grate bars adapted to be moved bodily out of the plane of the first series of bars to dislodge the contents of the pallet.

11. In a sintering machine wherein is provided a series of pallets and means for moving said pallets in a train through a continuous path and inverting the pallets to discharge the load, a set of pallet grates for each pallet, each comprising a set of fixed bars and a set of movable grate bars and means for limiting the motion of said movable bars to a direction substantially at right angles to the plane of the grate to thereby dislodge the contents of the pallets upon inversion thereof.

12. In combination with a treatment vessel, a grate presenting a substantially even surface for the support of the charge to be treated, said vessel being tiltable for dumping the charge, and means for causing a distortion of the charge-supporting surface of the grate with a dumping movement of the vessel.

13. In combination with a treatment vessel tiltable in a vertical plane about a fixed axis, a grate presenting a substantially even surface for the support of the charge to be treated, and means for causing a distortion of the charge-supporting surface of the grate with a tilting of the vessel to dumping position.

14. A grate of the character described, comprising a series of component members forming a support for the charge, and means for permitting a member to participate in a limited outward movement from its normal position of rest.

15. In a grate of the character described, comprising a series of component members forming a support for the charge, and means for permitting a member to participate in a limited outward movement in a direction transverse to the supporting surface of the grate.

16. A grate of the character described, comprising a series of component members collectively presenting a normally horizontal supporting surface for the charge, and means for permitting a member to participate in a limited vertical outward movement.

17. A grate of the character described, comprising a series of component members collectively forming a support for the charge, said grate being provided with openings for the passage of gases, and means for permitting a member to participate in a limited outward movement in a direction transverse to the supporting surface of the grate.

18. A grate of the character described, comprising a series of grate-bars spaced suitable distances apart to form grate openings, means for supporting the bars, and means for permitting a predetermined number of the bars to participate in a limited outward movement in a direction transverse to the supporting surface of the grate.

19. In combination with a sintering pan rotatable in a vertical plane for dumping the charge treated, supporting means positioned beneath the charge during the period of treatment, said supporting means participating in a limited downward movement to break up and dislodge any sintered material adhering thereto upon rotation of the pan to dumping position.

20. In combination with a sintering pan tiltable in a vertical plane for dumping the charge treated, a support for the charge, and means for causing said support to shift its position within suitable limits with a dumping movement of the pan, in a direction operating to release any sintered material adhering to the support.

21. In combination with a sintering pan mounted to be inverted for dumping the treated charge, a series of supports for the charge, and means for causing a predetermined portion of said supports to become displaced from their normal positions of rest with an inversion of the pan, said displacement being in a direction operating to break up and release any sintered material adhering to said supports.

22. In combination with a sintering pan tiltable in a vertical plane for purposes of dumping, a grate for supporting the charge during treatment, said grate having component parts capable of a limited vertical movement, and means cooperating with said parts to cause a vertical outward displacement thereof from their normal positions of rest with a dumping movement of the pan, thereby dislodging and breaking up any sinter adhering to the grate.

23. In combination with a grate-bar, a suitable support for the bar, and cooperating means between the bar and its support for causing the bar to drop a certain distance with an inversion of the bar and its support.

24. In combination with a sintering pan mounted to be inverted for dumping the treated charge, supporting means positioned beneath the charge during the period of treatment, said supporting means participating at different points in a limited downward movement to break up and dislodge any sintered material adhering thereto, upon the tilting of the pan to dumping position.

25. In combination with a tiltable treatment vessel, a grate member positioned to support the charge and being at rest during the treatment of the charge, and means for causing said member to drop through a limited distance away from its normal position of rest, with a dumping movement of the vessel.

26. In combination with a tiltable treatment vessel, a perforated support for the charge, and means for causing different portions of said support to drop through a limited distance away from their original positions of rest with a dumping movement of the vessel.

27. In combination with a tiltable sintering pan, a grate comprising a plurality of independent members for supporting the charge, and means for causing a portion of the members to participate in a limited downward displacement from their original supporting positions with a dumping movement of the pan.

28. In combination with an open top sintering pan rotatable about a fixed axis for dumping, a grate comprising a plurality of bars spaced apart and collectively presenting an even supporting surface to the charge resting thereon, and means for causing a portion of the bars to participate in a limited drop with a dumping movement of the pan.

29. In a tiltable treatment vessel, a grate comprising a plurality of members spaced apart, and means for imparting to any predetermined number of the members a limited outward displacement in a direction tranverse to the charge-supporting surface of the grate with a dumping movement of the vessel.

30. In combination with a treatment vessel tiltable in a vertical plane, a grate member participating in a limited outward movement or drop with a tilting of the vessel to dumping position.

31. In combination with a tiltable treatment vessel, a grate comprising a series of component members forming a support for the charge, and means for causing a member to participate in a limited outward movement from its normal position of rest with a tilting of the vessel to dumping position.

Signed this 24th day of March, 1923.

AUGUST L. LARSON.